US008459204B2

(12) United States Patent
Lato

(10) Patent No.: US 8,459,204 B2
(45) Date of Patent: Jun. 11, 2013

(54) LIVESTOCK FEEDER SYSTEM

(76) Inventor: Roy Lato, Thorp, WI (US)

(*) Notice: Subject to any disclaimer, the term of this patent is extended or adjusted under 35 U.S.C. 154(b) by 196 days.

(21) Appl. No.: 13/150,314

(22) Filed: Jun. 1, 2011

(65) Prior Publication Data

US 2011/0297092 A1 Dec. 8, 2011

Related U.S. Application Data

(60) Provisional application No. 61/352,161, filed on Jun. 7, 2010.

(51) Int. Cl.
A01K 5/00 (2006.01)

(52) U.S. Cl.
USPC ............................................. 119/53

(58) Field of Classification Search
USPC ................... 119/52.1, 53, 53.5, 54
See application file for complete search history.

(56) References Cited

U.S. PATENT DOCUMENTS

| 45,190 | A | 11/1864 | Stellar |
|---|---|---|---|
| 48,641 | A | 7/1865 | Barnard |
| 138,332 | A | 4/1873 | Hughes et al. |
| 138,801 | A | 5/1873 | Hall |
| 166,719 | A | 8/1875 | Ralph |
| 191,590 | A | 6/1877 | Howard |
| 194,819 | A | 9/1877 | Hayden et al. |
| 311,880 | A | 2/1885 | Doty |
| 366,933 | A | 7/1887 | Cowan |
| 396,563 | A | 1/1889 | Hawkins |
| 463,857 | A | 11/1891 | Crabb |
| 478,402 | A | 7/1892 | Chamberlain |
| 489,589 | A | 1/1893 | Lewis |

(Continued)

FOREIGN PATENT DOCUMENTS

| CA | 1129736 | 8/1982 |
|---|---|---|
| CA | 1172923 | 8/1984 |

(Continued)

OTHER PUBLICATIONS

Crystal Spring Hog Equipment product sheets (undated), Ste Agathe, Canada.

(Continued)

Primary Examiner — Son T Nguyen
(74) Attorney, Agent, or Firm — Price Heneveld LLP

(57) ABSTRACT

An animal feeder has a feed hopper with side walls, end walls, a bottom assembly, and an open top. Moveable gates extend below the lower edge of the side walls and are slidably mounted upon the side walls. The bottom assembly includes a feed trough under the gate in communication with the feed hopper. An adjustment mechanism allows vertical adjustment of the gate relative to the feed trough and includes an upwardly extending rod connected at its lower end to the gate and at its upper end to one end of a crank lever. The crank lever is rotatable about a pivot provided in a bracket extending perpendicularly to the end walls of the feed hopper. A pair of handles extends through a pair of slots provided in an arcuate panel attached to the bracket. Rotational movement of the handle and crank lever cause vertical adjustment of the gate. A pawl attached to the handle locks the handle in any of a plurality of different angular positions of adjustment in the slot, which has a plurality of notches located on an edge thereof into which the pawl of the handle is movable to secure the handle against inadvertent movement.

19 Claims, 5 Drawing Sheets

U.S. PATENT DOCUMENTS

| | | | |
|---|---|---|---|
| 545,673 | A | 9/1895 | Burke |
| 555,781 | A | 3/1896 | Lewis |
| 581,120 | A | 4/1897 | Johnson |
| 776,912 | A | 12/1904 | Howard |
| 791,171 | A | 5/1905 | Washburn |
| 845,982 | A | 3/1907 | Smith |
| 846,175 | A | 3/1907 | Xevers |
| 947,262 | A | 1/1910 | Storelee |
| 978,915 | A | 12/1910 | Mastrud |
| 984,890 | A | 2/1911 | Taylor |
| 997,248 | A | 7/1911 | Freeman |
| 1,138,102 | A | 5/1915 | Giltner |
| 1,223,213 | A | 7/1917 | Fouts |
| 1,265,025 | A | 5/1918 | Aker |
| 1,316,838 | A | 9/1919 | Hawkins |
| 1,376,685 | A | 5/1921 | Easter |
| 1,469,677 | A | 10/1923 | Naylor |
| 1,836,274 | A | 12/1931 | Norton |
| 1,919,587 | A | 7/1933 | Einsel et al. |
| 2,660,149 | A | 11/1953 | Jolly |
| 2,661,720 | A | 12/1953 | Rysdon et al. |
| 2,787,404 | A | 4/1957 | Vandenberg et al. |
| 2,808,028 | A | 10/1957 | Landgraf |
| 2,933,064 | A | 4/1960 | Geerings |
| 2,941,506 | A | 6/1960 | Fulton |
| 3,050,030 | A | 8/1962 | Grundmeier |
| 3,066,649 | A | 12/1962 | Geerlings |
| 3,102,511 | A | 9/1963 | Atcheson |
| 3,234,911 | A | 2/1966 | Chubbuck |
| 3,270,857 | A | 9/1966 | Wilkes et al. |
| 3,320,930 | A | 5/1967 | Pockman et al. |
| 3,602,195 | A | 8/1971 | Blough |
| 3,827,405 | A | 8/1974 | Allen |
| 3,866,576 | A | 2/1975 | Downing |
| 3,911,868 | A | 10/1975 | Brembeck |
| 4,070,990 | A | 1/1978 | Swartzendruber |
| 4,180,014 | A | 12/1979 | Mathews |
| 4,278,049 | A | 7/1981 | Van Dusseldorp |
| 4,315,484 | A * | 2/1982 | Kingery ................... 119/53 |
| 4,380,214 | A | 4/1983 | Williams |
| 4,401,056 | A | 8/1983 | Cody et al. |
| RE31,939 | E | 7/1985 | Van Dusseldorp |
| 4,660,508 | A | 4/1987 | Kleinsasser et al. |
| 4,947,798 | A | 8/1990 | De Wispelaere |
| 4,949,676 | A | 8/1990 | Burns |
| 4,995,343 | A | 2/1991 | Cole et al. |
| 5,010,849 | A | 4/1991 | Kleinsasser |
| 5,036,798 | A | 8/1991 | King |
| 5,044,318 | A | 9/1991 | Sutton et al. |
| 5,069,164 | A | 12/1991 | Wiwi |
| 5,222,460 | A | 6/1993 | Evans, III |
| 5,272,998 | A | 12/1993 | Pannier et al. |
| 5,345,894 | A | 9/1994 | Evans, III et al. |
| 5,351,649 | A | 10/1994 | Rovira Badia et al. |
| 5,406,907 | A | 4/1995 | Hart |
| 5,558,039 | A | 9/1996 | Zimmerman |
| 5,570,656 | A | 11/1996 | Waldner et al. |
| 5,603,285 | A | 2/1997 | Kleinsasser |
| 5,640,926 | A | 6/1997 | Kleinsasser |
| 5,921,200 | A | 7/1999 | Bondarenko et al. |
| 6,253,705 | B1 * | 7/2001 | Pollock et al. ............ 119/53.5 |
| 6,269,770 | B1 | 8/2001 | Bondarenko et al. |
| 6,330,867 | B1 * | 12/2001 | Rasmussen .............. 119/52.1 |
| 6,526,913 | B2 | 3/2003 | Bondarenko et al. |
| 6,536,373 | B1 | 3/2003 | Bondarenko et al. |
| 6,637,368 | B2 | 10/2003 | Bondarenko et al. |
| 6,766,765 | B2 | 7/2004 | Bondarenko et al. |
| 6,923,142 | B2 | 8/2005 | Kleinsasser |
| 6,976,450 | B2 | 12/2005 | Bondarenko et al. |
| 7,134,402 | B2 | 11/2006 | Bondarenko et al. |
| 7,278,371 | B1 | 10/2007 | Lato |
| 7,530,328 | B2 | 5/2009 | Bondarenko et al. |
| 7,975,648 | B2 * | 7/2011 | Kleinsasser ................. 119/53 |
| 2005/0132967 | A1 * | 6/2005 | Kleinsasser ................. 119/53 |
| 2006/0032449 | A1 * | 2/2006 | Bondarenko et al. .......... 119/53 |
| 2008/0276873 | A1 * | 11/2008 | Waldner et al. ............. 119/51.5 |
| 2009/0223457 | A1 | 9/2009 | Bondarenko et al. |
| 2010/0229799 | A1 * | 9/2010 | Brehmer et al. ............ 119/53.5 |

FOREIGN PATENT DOCUMENTS

| | | |
|---|---|---|
| CA | 2559967 | 9/1998 |
| CA | 2236017 | 11/1998 |
| DE | 2158285 | 5/1973 |
| FR | 2565462 | 12/1985 |
| GB | 1422954 | 7/1973 |
| GB | 1482339 | 11/1975 |

OTHER PUBLICATIONS

Chore-Time Generation 4(tm) Dry Feeders product sheet (undated), www.ctbinc.com.
Brower's Lo-Boy, Ez-Just, Better-Built Hog Equipment product sheet (No. 7612), Brower, Quincy, Illinois.
Pride of the Farm, Automatic Waterers and Feeders product brochure (1967) Hawkeye Steel Products, Inc., Waterloo, Iowa.
M. Brumm, J. Dahlquist, Nebraska Swine Reports, "Impact of Feeder and Drinker Designs on Pig Performance, Water Use and Manure Production," University of Nebraska—Lincoln, Animal Science Department (1997).
Shenandoah, Chromized Steel Hog Feeders product sheet (undated).
Osborne Industries Inc., Osborne Feeders product sheet (undated).
WLC Company, Inc., hog feeder product sheets (Oct. 12, 1988).
Ideal, Stainless Steel Confinement Feeders product sheet (undated), Jefferson, Iowa.
Modern Hog Concepts, Round (Feed-Saver) Hole Stainless Steel Feeders product sheet (undated), Iowa.
Schouten Feeders Inc., The Feed Saver product sheet (undated), Caledonia, Ontario.
Marting Mfg. Inc., Smidley feeders product sheets (undated), Iowa.
Werk Weld Inc., Creep Feeder product sheets (undated), Armour, South Dakota.
Crystal Spring Hog Equipment, N3 dry nursery feeder product sheets (undated), Ste Agathe, Canada.
History of Hawkeye Steel Products Inc.
Hawkeye Steel Products, Inc., Adjustomatic Capacity Feeder product sheets (undated), Waterloo, Iowa.
Brower, Lo-Boy E-Z Just product sheet (undated), Quincy, Illinois.
Hawkeye Steel Products, Automatic Waterers and Feeders product line (1967), Waterloo, Iowa.
Pax Steer Feeder product sheets (undated).
Pride of the Farm, Rectangular Penline Hog Feeders product sheets (undated) Hawkeye Steel Products, Inc., Waterloo, Iowa.
Pride of the Farm, Perma-Pride Hog Feeders product sheet (undated) Hawkeye Steel Products, Inc., Waterloo, Iowa.

* cited by examiner

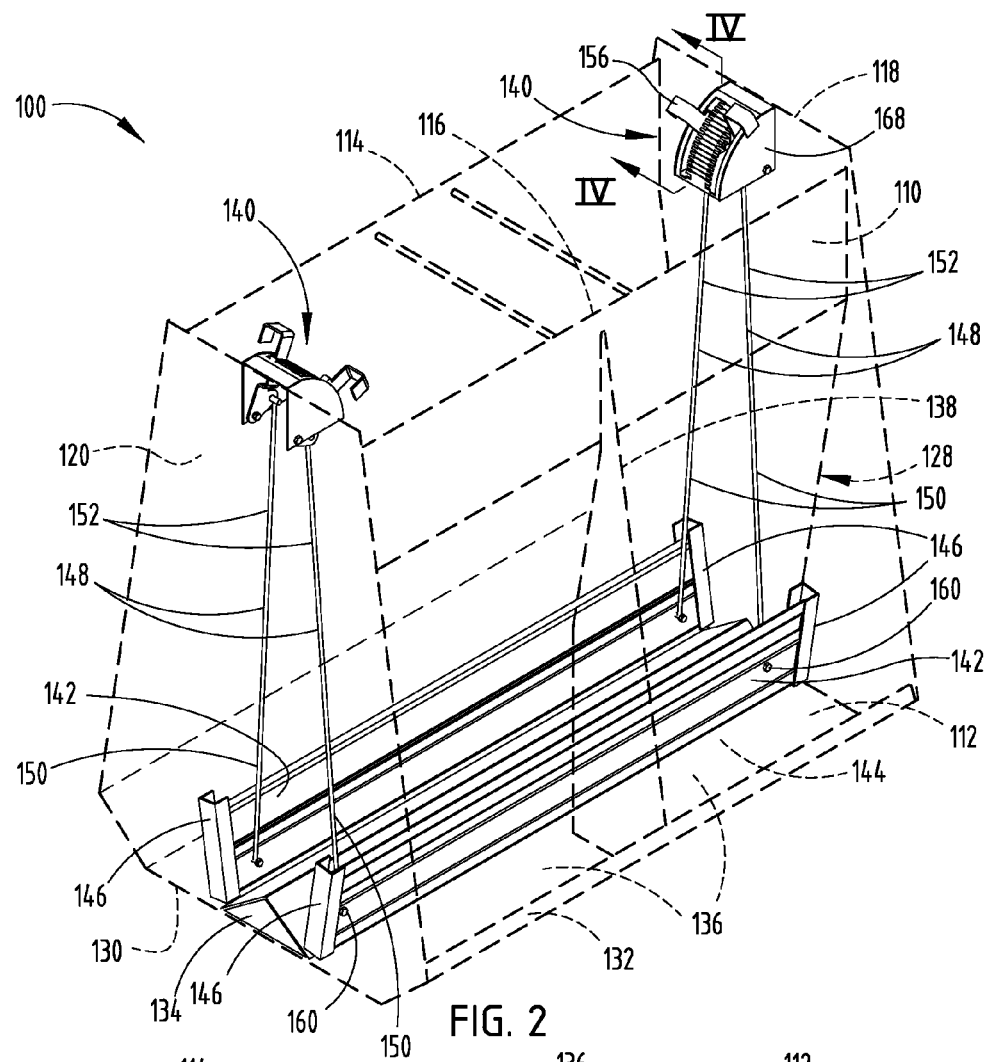
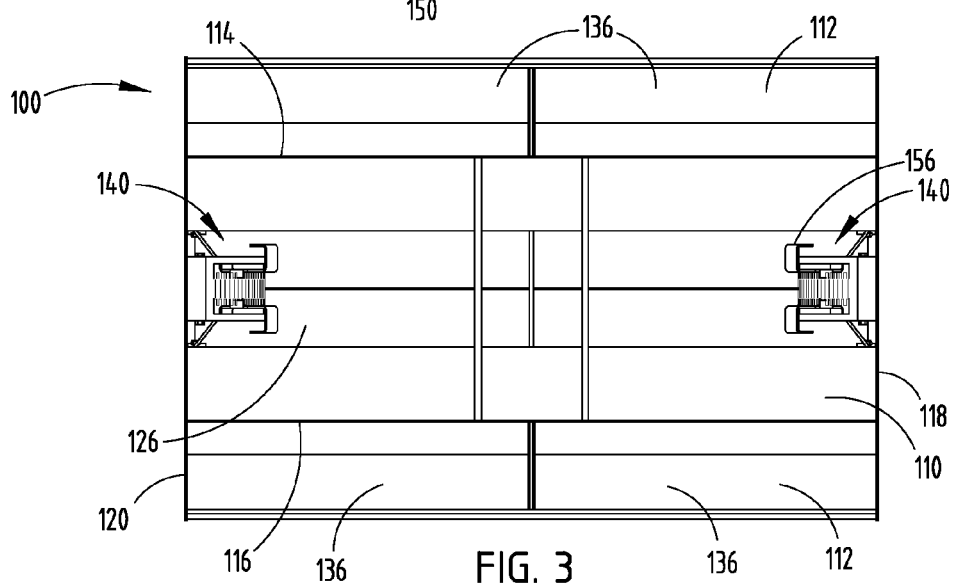

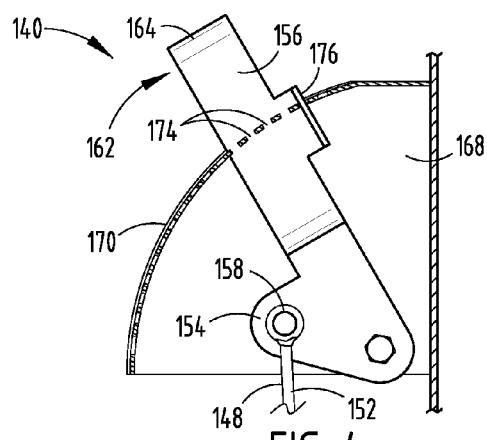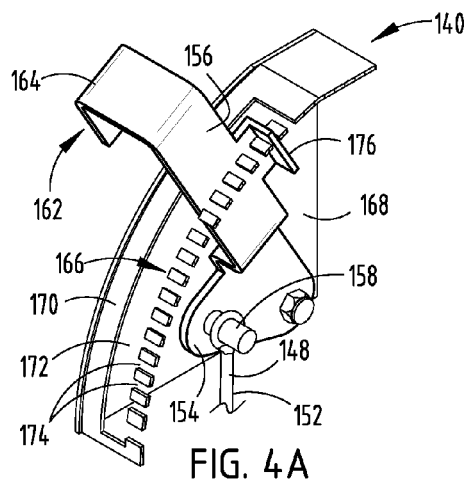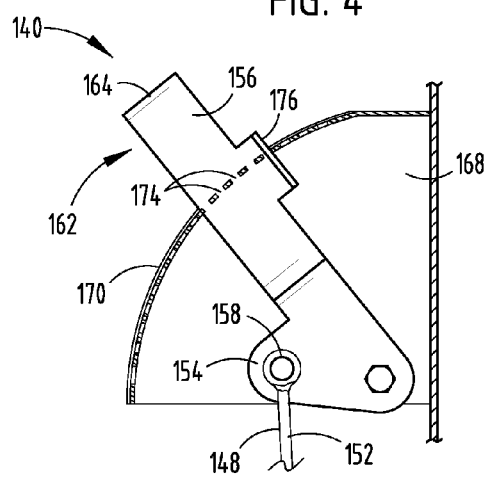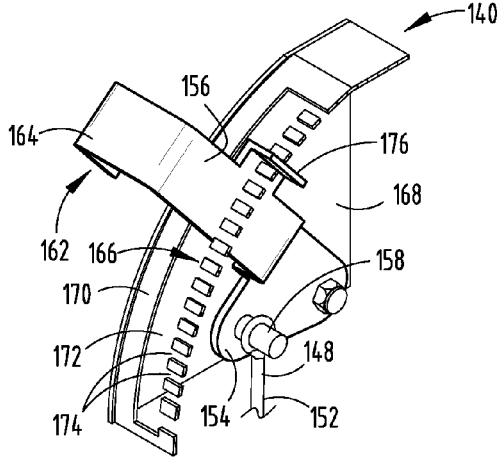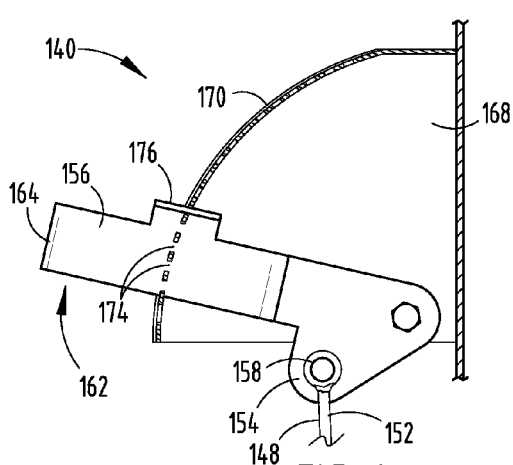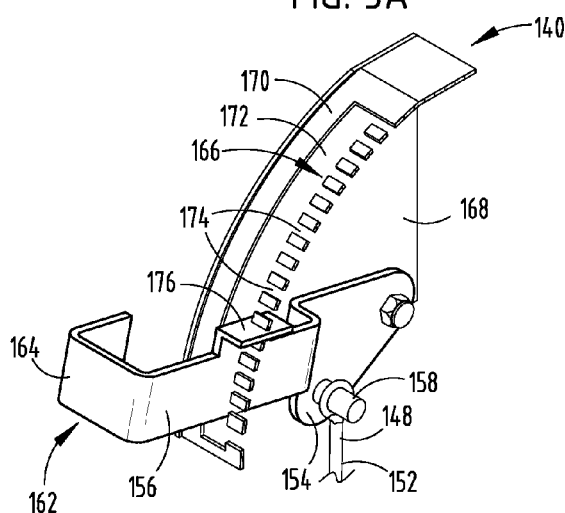

8,459,204 B2

LIVESTOCK FEEDER SYSTEM

CROSS-REFERENCE TO RELATED APPLICATION

This application claims the priority benefit of U.S. Provisional Application No. 61/352,161 filed on Jun. 7, 2010, the entire disclosure of which is incorporated by reference.

BACKGROUND

This invention relates to a livestock feeder system, and more particularly to a hopper style feeder system.

SUMMARY OF THE INVENTION

Hopper style feeders usually comprise a feed storage hopper mounted above a feed trough. Dry food materials stored in the hopper flow downwardly by gravity from the hopper into the feed trough. As the livestock consumes food from the trough, more food automatically flows into the trough to replace that which has been consumed.

In order for food to flow from the hopper into the feed trough it must flow beneath a moveable gate. Consequently, the spacing of the gate from the bottom of the trough controls the rate of flow from the hopper into the trough. To accommodate gravity flow of differing food materials and/or of food materials of differing granular size and under differing humidities or to accommodate the needs of different sized livestock (e.g., piglet versus sow), this feed opening may be adjusted to maintain optimal flow from the feeder.

It is an objective of this system to provide a livestock feeder in which the feeder opening may be easily and quickly adjusted by means of an adjustment mechanism accessible through the open top of the hopper.

According to the practice of this system, this adjustment mechanism comprises a pivotable handle disposed at the top of the feeder which is connected to the adjustable gate through a crank lever so that movement of the handle effects movement of the gate. The connection is such that the adjustment may be made independently of the amount of feed in the hopper and without the use of any tools.

In the preferred embodiment, the pivotable handle is connected to a connecting rod that connects the crank lever to a slidable gate mounted in slides at the bottom of the hopper.

An advantage of this system is in the fact that feed opening adjustments may be easily made from the top of the hopper. Consequently, the feeder is easily adjusted to accommodate all of the differing conditions to which such feeders are commonly exposed and will be maintained in a condition in which there is the free flow of food through the opening without excessive flow.

These and other objects and advantages of this system will be more readily apparent from the following description of the drawings in which:

BRIEF DESCRIPTION OF THE DRAWING FIGURES

FIG. 2 is a perspective view of the adjustment mechanism and slidable gates of the feeder of the present disclosure;

FIG. 3 is a top view of the feeder of the present disclosure;

FIGS. 4-6 are cross-sectional side views of the adjustment mechanism of the feeder of the present disclosure;

FIGS. 4A-6A are perspective sectional views of the adjustment mechanism of the feeder of the present disclosure;

DETAILED DESCRIPTION OF THE PREFERRED EMBODIMENTS

Figure 1:
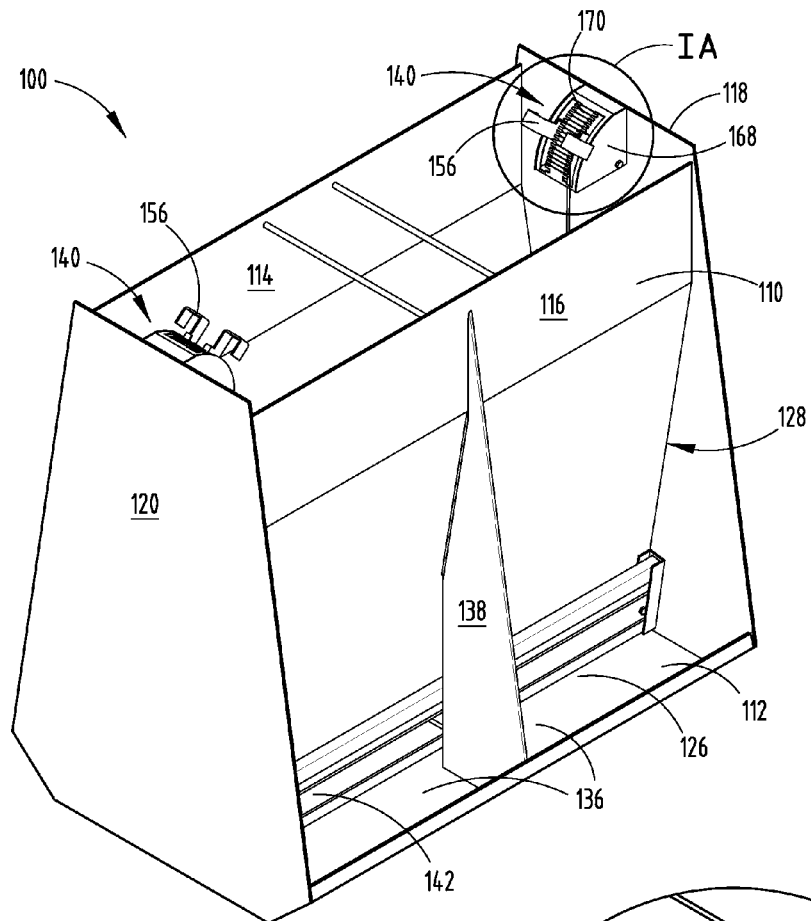
FIG. 1 is a perspective view of a feeder of the present disclosure.

For purposes of description herein, the terms "upper," "lower," "right," "left," "rear," "front," "vertical," "horizontal," and derivatives thereof shall relate to the system as oriented in FIG. 1. However, it is to be understood that the system may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1 and 2, it will be seen that the feeder 100 of this system comprises a hopper 110 for receiving and storing dry, granular, or ground foods and for gravity feeding the foods into a feed trough 112 located beneath the hopper 110. The feeder 100 is an automatic feeder in the sense that it automatically feeds stored food into the trough 112 as livestock consume it. The hopper 110 comprises side walls 114, 116 and end walls 118, 120. Bags of feed may be dumped into the hopper 110.

As may be seen more clearly in FIGS. 1 and 3, the lower portions of the side walls 114, 116 of the hopper 110 taper inwardly to form a relatively narrow passage 126 through which feed must pass in the course of flowing into the trough 112. This inward taper of the side walls 114, 116 provides an overhang 128 of those walls over the feed trough 112. This overhang 128 prevents the livestock from standing in the trough 112 while feeding and affords some protection of the food contained within the trough 112.

The feed trough 112 may extend for the full length of the hopper 110. Its end walls 118, 120 are common to the end walls of the hopper 110. In addition to the end walls 118, 120, the trough 112 comprises a bottom wall 130 and side walls 132. There is a triangular shaped longitudinal divider 134 which extends for the full length of the hopper 110. This divider 134 guides gravity fed food outwardly to the sides of the trough 112 and prevents food from accumulating in the center thereof, where it might others not be accessible to animals feeding within the trough 112. The trough 112 is divided into individual feed bins 136 by transversely extending divider walls 138. These walls 138 extend from the side walls 114, 116 inwardly to a point beneath the hopper 110.

Within each feed bin 136 there is a sloping side wall (not shown) which extends at an angle of approximately 45 degrees between the top edge of the side wall 132 and the bottom wall 130. These sloping walls prevent food from entering and accumulating in the corner of the trough 112 where it would otherwise be inaccessible to animals feeding in the feed bins 136.

Located within the feed trough 112 is a pair of gates 142, one gate being provided for each pair of side-by-side feed bins 136. In order to flow from the hopper into feed bins 136 of the feed trough 112, and thereby become accessible to the animal feeding in the trough 112, the food must flow beneath the gates 142 through an opening 144. The height of this opening 144 is adjustable so as to vary or control the rate of flow of food from the hopper 110 into the feed bins 136.

At each of end walls 118, 120 of the hopper 110, there is a slide bracket 146 which functions as a slideway for the gates 142. The gates 142 extend upwardly through the slide brackets 146 and is slideable therein.

Each gate 142 is supported which the slide brackets 146 by connecting rods 148, one connecting rod 148 attached at a lower end 150 thereof to each end of the gates 142. An upper end 152 of the connecting rod 148 is attached to crank lever 154 of a pivotable handle 156 of the adjustment mechanism 140.

As shown in the figures, two pairs of pivotable handles 156 are provided, one pair at each end of the hopper 110 and on each of the end walls 118, 120. The crank levers 154 extend downwardly from and are found at a distal end of the pivotable handle 156. At their outer ends, the crank levers 154 each have a threaded stud 158 by which the upper end 152 of the connecting rod 148 is attached. The upper end 152 of the connecting rod 148 is attached to the threaded stud 158 by a fastener. At its lower end 150, each connecting rod 148 is turned inwardly and extends through a hole 160 in the gate 142. The lower end 150 of the connecting rod 148 is retained within the hole 160.

To control the angular rotation of the crank lever, the pivotable handle 156 extends outwardly such that rotational motion of the handle 156 effects angular rotation of the crank lever 154. At a distal end 162, the handle 156 is bent so as to provide a gripping flange 164 by which a person may grasp to move the pivotable handle 156 through arcuate movement.

As best seen in FIGS. 4-6 and 4A-6A, the handle 156 of the adjustment mechanism 140 may be retained in any one of seventeen different angular positions of adjustment 166. To this end, a bracket 168 is mounted perpendicularly to each end wall 118, 120. The bracket 168 and an arcuate panel 170 extend perpendicularly from the wall 118, 120, where the arcuate panel 170 has a pair of slots 172, each of which has seventeen arcuate notches 174 formed on a side thereof. A pawl 176 provided on and perpendicular to an edge of the pivotable handle 156 is provided to lock the handle 156 in any one of seventeen different positions of adjustment 166. Preferably, the handle 156 is fabricated from spring steel, which may be resiliently displaced from the side notches 174 by the operator to move the handle 156. The pawl 176 is preferably formed at an upper edge of the pivotable handle 156 at right angles thereto. The handle 156 is preferably mounted to the bracket 168 by fasteners 178.

Figure 1A:
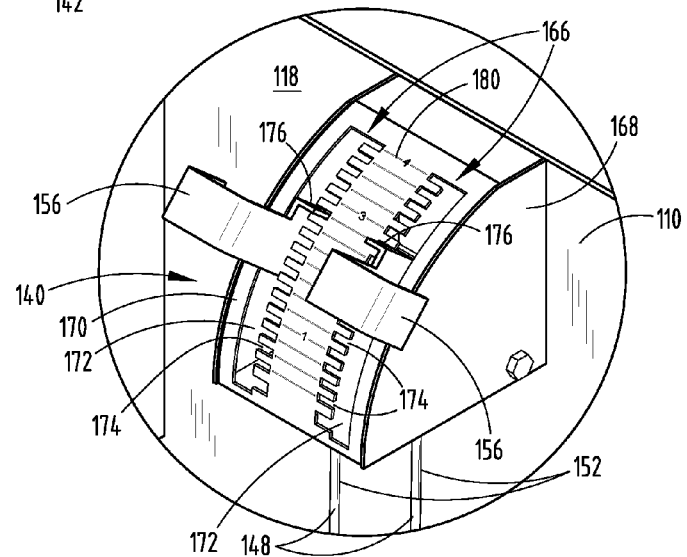
FIG. 1A is an enlarged perspective view of the adjustment mechanism of the feeder of the present disclosure shown in FIG. 1.
Figure 7:
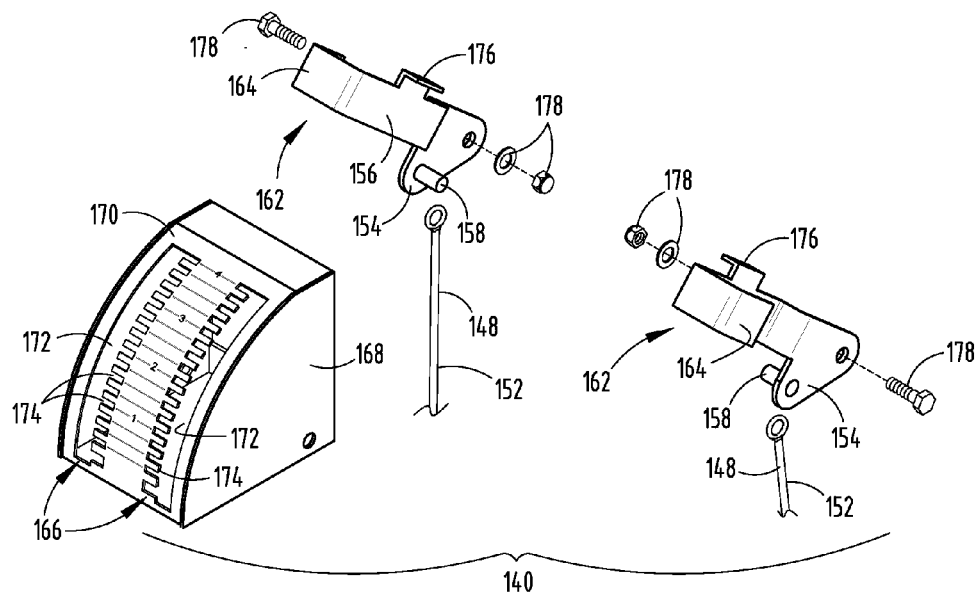
FIG. 7 is a perspective view of the adjustment mechanism of the feeder of the present disclosure.
Figure 8:
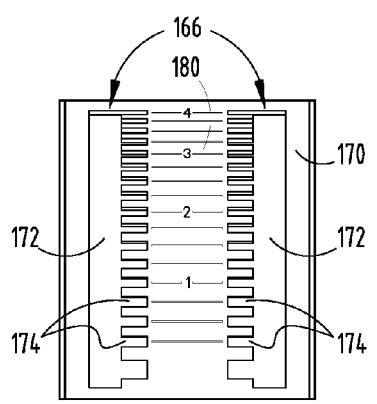
FIG. 8 is a top view of the adjustment mechanism of the feeder of the present disclosure.
Figure 9:
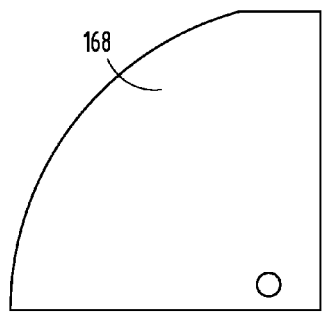
FIG. 9 is a side view of the adjustment mechanism of the feeder of the present disclosure.
Figure 10:
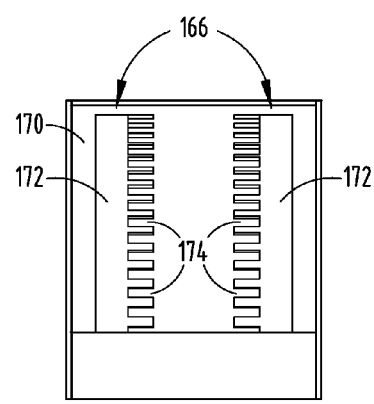
FIG. 10 is a back view of the adjustment mechanism of the feeder of the present disclosure.
Figure 11:
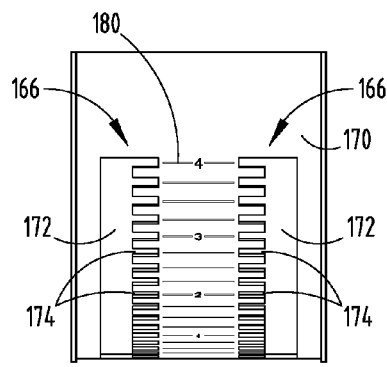
FIG. 11 is a top view of the adjustment mechanism of the feeder of the present disclosure.
Figure 12:
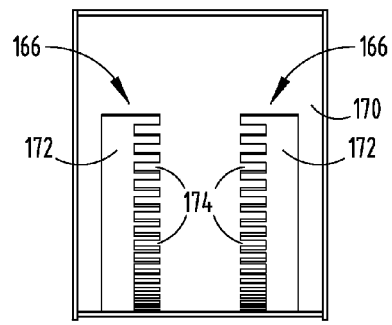
FIG. 12 is a bottom view of the adjustment mechanism of the feeder of the present disclosure.
Figure 13:
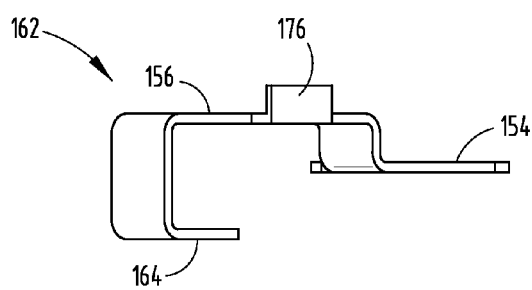
FIG. 13 is a top view of the handle and crank lever of the adjustment mechanism of the feeder of the present disclosure.
Figure 14:
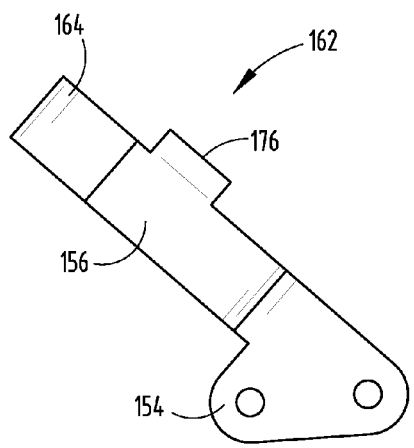
FIG. 14 is a first side view of the handle and crank lever of the adjustment mechanism of the feeder of the present disclosure.
Figure 15:
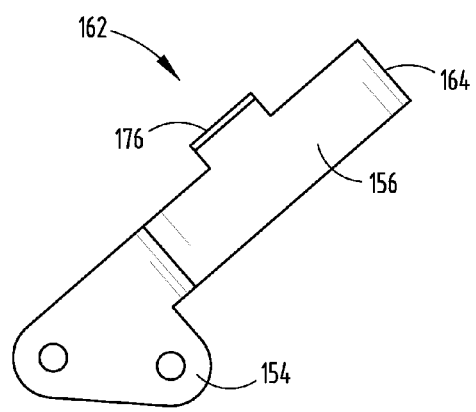
FIG. 15 is a second side view of the handle and crank lever of the adjustment mechanism of the feeder of the present disclosure.

An indicia 180 corresponding to the relative height of the gate 142 and the size of the opening 144 can be provided on the acruate panel 170, as shown in FIGS. 1A and 8, making adjustment of the opening 144 predictable and repeatable. The indicia 180 may be provided as a relative value, as shown, or an absolute or specific height interval for the gate opening 144.

Preferably, a pair of handles 156 are provided in each in a pair of slots 172 of each of the brackets 168 and attached to each end wall 118, 120 of the hopper 110. This allows separate and independent actuation of each end of the gates 142, as will be discussed below.

To effect vertical adjustment of one or both ends of the gate 142, the pawl 176 on the appropriate pivotable handle 156 is moved from one notch 174 to another. Of course, the number of notches 174 is arbitrary and could be varied to accommodate as many positions of adjustment 166 as desired. Angular movement of the pivotable handle 156 from one notch 174 to another results in rotational movement of the crank lever 154, as shown in FIGS. 4-6. This angular rotation of the crank lever 154 effects vertical adjustment of the connecting rod 148 and of the attached gate 142.

In operation, bags of feed are dumped into the hopper 110 of the feeder 100 so as to provide a large reservoir of feed within the hopper 110. That feed flows downwardly through the passage 126 of the hopper 110 and outwardly through the feed opening 144 beneath the gate 142 and into the feed bins 136 of the feed trough 112. As livestock feed upon the food contained within the feed bins 136, additional food flows downwardly through the hopper 110 and into those bins 136, so that the bins 136 remain automatically supplied with food.

In the event that the flow of food from the hopper 110 into the feed bins 136 is insufficient, or in the event that the size of the food particles contained within the hopper 110 is changed, it may be necessary to raise the gate 142 and increase the size of the opening 144 beneath the gate 142. In that event, one of the pivotable handles 156 is rotated upwardly, depending on which end of the gate 142 is to be adjusted. This has the effect of causing the gate 142 to raise upwardly. Thus, the feed opening 144 is increased in height. Alternatively, if the feed opening 144 is to be decreased, the handle 156 is moved in the opposite direction, i.e., downwardly as viewed in FIG. 2, thereby causing the gate 142 to move downwardly relative to the hopper 110. This results in the gate 142 being lowered, thereby decreasing the height of the feed opening 144 through which the food must pass in the course of moving from the hopper 110 into the feed bin 136.

The primary advantage of this system resides in the ease with which the size of the feed opening 144 between the gate 142 and the bottom wall 130 of the feed trough 112 may be varied to increase or decrease the flow of food through that opening 144 into the feed trough 112. All that is required is for the workman to move the pivotable handle 156.

The above description is considered that of the preferred embodiments only. Modifications of the system will occur to those skilled in the art and to those who make or use the system. Therefore, it is understood that the embodiments shown in the drawings and described above are merely for illustrative purposes and not intended to limit the scope of the invention, which is solely defined by the following claims as interpreted according to the principles of patent law, including the doctrine of equivalents.

I claim:

1. An animal feeder, comprising:
   a feed hopper having side walls, end walls, a bottom assembly, and an opening at a top portion;
   a moveable gate positioned to extend below a lower edge of at least one of said side walls and being slidably mounted upon said one side wall;

said bottom assembly including a feed trough under said gate and in communication with said feed hopper;

an adjustment mechanism for effecting vertical adjustment of said gate relative to said feed trough, said adjustment mechanism including an upwardly extending rod connected at its lower end to said gate and at its upper end to one end of a crank lever, said crank lever being rotatable about a pivot provided on a bracket perpendicularly attached to one of said end walls of said feed hopper, and a handle extending through a slot provided in an arcuate panel attached to the bracket for effecting rotational movement of said crank lever about said pivot to cause vertical adjustment of said gate; and a pawl attached to the handle for locking the handle in any of a plurality of different angular positions of adjustment, said slot of said arcuate panel having a plurality of notches located on an edge thereof into which the pawl of said handle is movable to secure said handle against inadvertent movement.

2. The animal feeder of claim 1, in which the side walls of said feed hopper slope downwardly and inwardly.

3. The animal feeder of claim 1, in which said notches are rectangularly shaped.

4. The animal feeder of claim 1, further comprising a pair of said adjustment mechanisms, each of the pair of adjustment mechanisms attached to opposite end walls of the hopper, wherein each adjustment mechanism includes a crank lever, a pivot and bracket, and an upwardly extending rod connected at its lower end to an end of said gate and at its upper end to one of said crank levers, each of said crank levers being rotatable about said pivot provided on said bracket perpendicularly attached to said end walls of said feed hopper, and a pair of handles accessible through a pair of parallel slots provided in said arcuate panel attached to the bracket for effecting selective, rotational movement of each of said crank levers about said pivots to cause vertical adjustment of one of said pairs of gates.

5. The animal feeder of claim 1, further comprising a pair of feed troughs on opposite sides of the feeder and a pair of feed gates, each located proximate one of each of the feed troughs, wherein said adjustment mechanism comprises two pairs of pivotable handles, each one of said pair of handles operatively coupled to one of a pair of crank levers, said pair of crank levers extending downwardly from and attached at a distal end of each handle at their outer ends.

6. The animal feeder of claim 5, further comprising a pair of said adjustment mechanisms provided at each end of the hopper and on each of the end walls.

7. The animal feeder of claim 1, wherein the crank lever has a threaded stud by which the upper end of the connecting rod is attached and said connecting rod being turned inwardly and extending through a hole in the gate, wherein the lower end of the connecting rod is retained within the hole.

8. The animal feeder of claim 1, wherein an indicia indicative of the vertical adjustment of said gate relative to said feed trough is provided proximate said notches.

9. The animal feeder of claim 1, wherein said handle further comprises a pawl provided on and perpendicular to said handle, said pawl comprising a formed portion of an upper edge of the handle at right angles thereto.

10. The animal feeder of claim 9, wherein said handle is fabricated from spring steel and is adapted to be resiliently displaced from the side notches to move said handle.

11. The animal feeder of claim 1, wherein each side wall slopes at an angle of approximately 45 degrees between the top edge of the side wall and the bottom assembly to prevent food from entering and accumulating in the trough.

12. An animal feeder comprising:
a feed hopper having side walls, end walls, a bottom assembly, and an opening at a top portion;
a moveable gate positioned to extend below a lower edge of at least one of said side walls and being slidably mounted upon said one side wall, said gate having a first end and second end;
said bottom assembly including a feed trough under said gate and in communication with said feed hopper;
a pair of adjustment mechanisms for effecting vertical adjustment of said gate relative to said feed trough, each of said adjustment mechanisms being mounted to an opposite end of said feed hopper and including an upwardly extending rod connected at its lower end to one of said first and second ends of said gate and at its upper end to one end of a crank lever, said crank lever being rotatable about a pivot provided on a bracket perpendicularly attached to said end walls of said feed hopper, and a handle extending through a slot provided in an arcuate panel attached to the bracket for effecting rotational movement of said crank lever about said pivot to cause vertical adjustment of one of said first and second ends of said gate; and
a pawl attached to the handle for locking the handle in any of a plurality of different angular positions of adjustment, said slot of said arcuate panel having a plurality of notches located on an edge thereof into which the pawl of said handle is movable to secure said handle against inadvertent movement.

13. The animal feeder of claim 12, further comprising a pair of feed troughs on opposite sides of the feeder and a pair of feed gates, each feed gate located proximate one of each of the feed troughs, wherein said adjustment mechanism comprises two pairs of pivotable handles, each one of said pair of handles operatively coupled to one of a pair of crank levers, said pair of crank levers extending downwardly from and attached at a distal end of each handle at their outer end to one of a pair of upwardly extending rods at an upper end and connected at their lower ends to one of said pair of gates, said crank levers being rotatable about a pivot provided on a bracket perpendicularly attached to said end walls of said feed hopper, and a pair of handles accessible through a pair of parallel slots provided in said arcuate panel attached to the bracket for effecting selective, rotational movement of each of said crank levers about said pivots to cause vertical adjustment of one of said pairs of gates.

14. The animal feeder of claim 13, wherein each of said parallel slots further comprises a plurality of notches in said arcuate panel.

15. The animal feeder of claim 12, wherein the crank lever has a threaded stud by which the upper end of the connecting rod is attached and said connecting rod being turned inwardly and extending through a hole in the gate, wherein the lower end of the connecting rod is retained within the hole.

16. The animal feeder of claim 12, wherein an indicia indicative of the vertical adjustment of said gate relative to said feed trough is provided proximate said notches.

17. The animal feeder of claim 12, wherein said handle further comprises a pawl provided on and perpendicular to said handle, said pawl comprising a formed portion of an upper edge of the handle at right angles thereto.

18. An animal feeder, comprising:
a feed hopper having side walls, end walls, a bottom assembly, and an opening at a top portion;
a pair of moveable feed gates positioned on each side of the hopper to extend below a lower edge of at least one of said side walls and being slidably mounted upon said side walls, each of said feed gates having a first end and second end;

said bottom assembly including a pair of feed troughs under said gate and in communication with said feed hopper, each feed gate located proximate one of each of the feed troughs;

a pair of adjustment mechanisms for effecting vertical adjustment of said gate relative to said feed trough, each of said adjustment mechanisms being mounted to an opposite end of said feed hopper and including an upwardly extending pair of rods connected at their lower end to one of said first and second ends of said gate and at their upper end to one of a pair of ends of a pair of crank levers, each of said crank levers being rotatable about a pivot provided on a bracket perpendicularly attached to said end walls of said feed hopper, and a pair of handles extending through a pair of parallel slots provided in an arcuate panel attached to the bracket for effecting selective, rotational movement of each of said crank levers about said pivot to cause vertical adjustment of one of said first and second ends of said gate; and a pawl attached to each of the handles for locking the handle in any of a plurality of different angular positions of adjustment, each of said slots of said arcuate panel having a plurality of notches located on an edge thereof into which the pawl of said handle is movable to secure said handle against inadvertent movement.

19. The animal feeder of claim 18, wherein each of said parallel slots further comprises a plurality of notches in said arcuate panel.

* * * * *